April 14, 1964 R. D. BIEBER 3,128,962
REEL DEVICE
Filed July 23, 1962 2 Sheets-Sheet 1
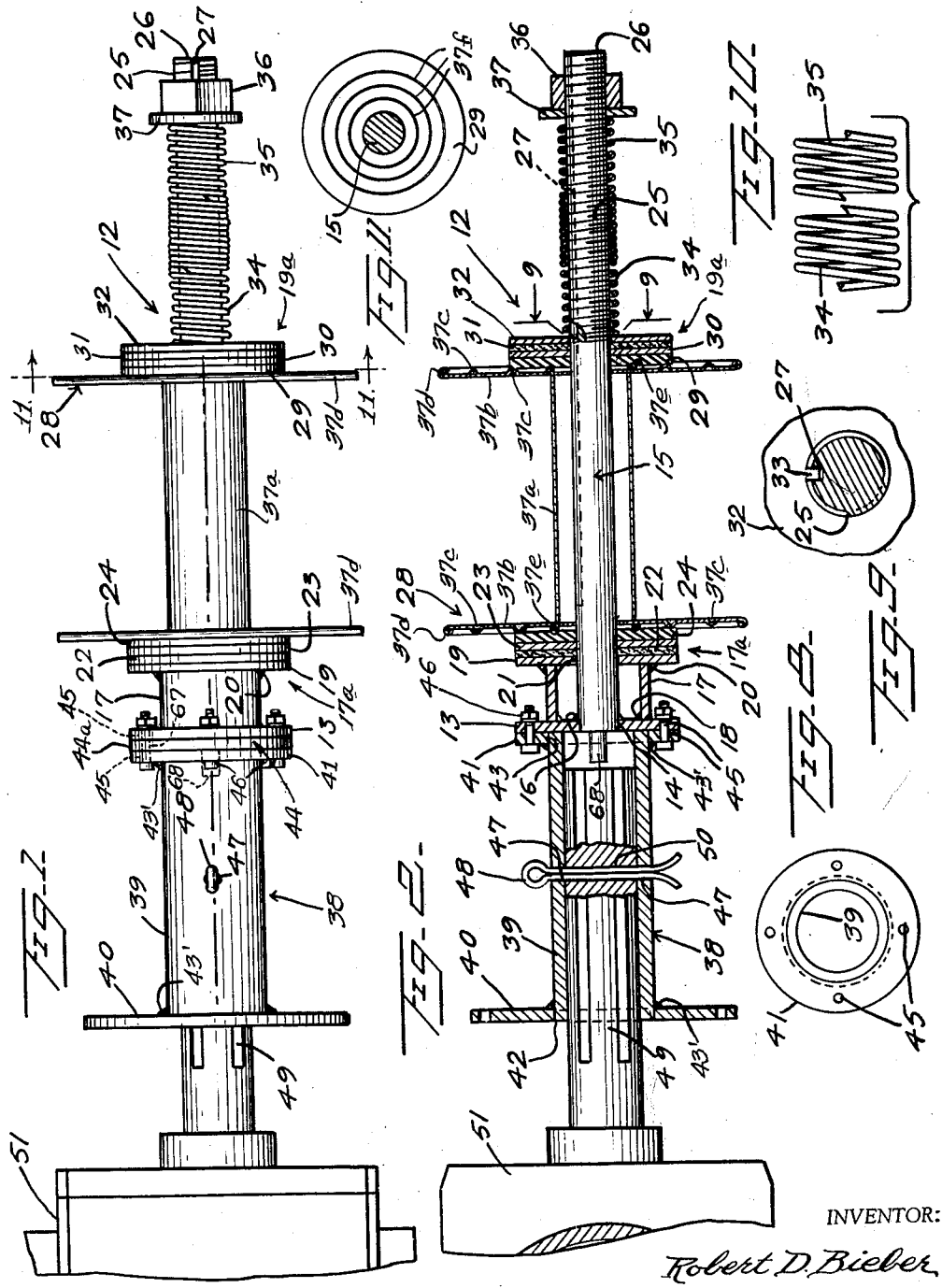
INVENTOR:
Robert D. Bieber
BY Hofgren, Brady, Wegner, Allen & Stellman
ATTORNEYS

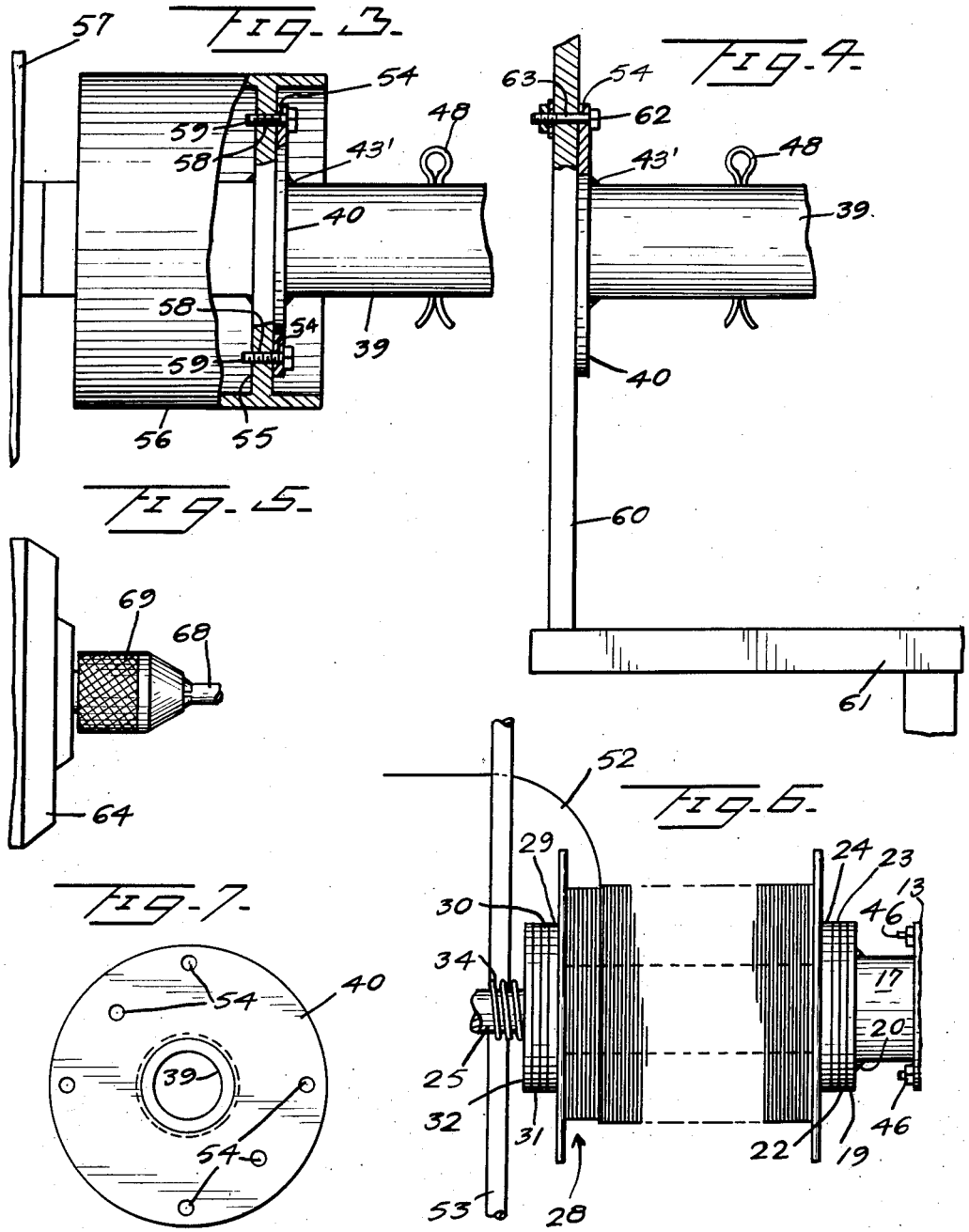

United States Patent Office 3,128,962
Patented Apr. 14, 1964

3,128,962
REEL DEVICE
Robert D. Bieber, Beecher City, Ill.
Filed July 23, 1962, Ser. No. 211,669
19 Claims. (Cl. 242—86.5)

This invention relates to a highly versatile reel device, and more particularly to such a device operatively attaching various types of spools for wire or the like to various mounts. This application is a continuation-in-part of my prior application Serial No. 44,995, filed July 25, 1960, and now abandoned.

The primary object of this invention is to provide a new and useful reel device.

A great many reel devices of various sorts have been developed for handling strands of material, such as wire or the like. While many of these devices are entirely adequate for their intended function, such prior devices have, in general, been entirely inadequate in providing adequate and practical versatility in handling wire, particularly as provided on various conventional commercial spools; and in attachment to different types of mounts or supports often encountered in the field. Most reel devices are intended to facilitate winding and unwinding wire, and to this end they are often provided with means for controlling rotation of the spool. However, difficulty is often encountered when a relatively fragile type of commercially available spool is used in prior reel devices. Such spools are usually provided with relatively light-weight circular flanges secured to either end of a core, sometimes by a rolled connection between the core and the flanges, thus providing lips extending outwardly from the flange faces. Often these flanges are provided with stamped ribs and rolled peripheral lips for strengthening the spool, and the ribs and similar protrusions on the flanges may vary in style from reel to reel. Prior reel devices have not been effective in this environment because the reel flanges are generally too weak to stand up under the force applied in holding the reel.

Thus, while some prior reel devices may be entirely adequate with certain types of spools, a close inspection of such devices will indicate that they are impractical when incorporating other types or spools. For example, in U.S. Patent 2,494,383 to Foran, a spring urges a clutch against a spool or reel, but with this spool mounting, in order to adequately control rotation of the spool the clutch must be urged against the spool with such force that a very sturdy spool is necessary, as illustrated therein. In U.S. 2,956,778 to Weide et al., clutches embrace opposite flanges of a reel, and these clutches have conventional clutch facing material engaging the reel flanges. While this construction may be adequate for its intended function, such clutch facing material will, in keeping with its intended function, permit the spool to slip on it, and with certain spools such slippage would twist or otherwise damage the spool flanges and the spool flanges should be smooth since such clutch facing material does not conform readily to irregularities in the spool flanges. A Schley et al. patent, U.S. 2,704,191 is somewhat similar to the Weide et al. patent in providing clutch facing material abutting a spool flange, but this patent mentions that metal plates may be inserted next to the spool ends if the ends are rough, so as to protect the clutch material as the spool slides on this material, and again a rugged spool is necessary.

Prior reel devices are also generally inadequate in providing a practical means for utilizing spools of varying overall length, and if any such means is provided it is usually in the form of a nut threaded on a shaft receiving the reel so that the nut may be threaded in and out in keeping with the length of the spool. This is generally an inconvenient arrangement when there is a substantial difference in spool length since it is often necessary to turn the nut a great number of times in order to properly hold the spool. Furthermore, after considerable use the shaft threads will probably become damaged by supporting relatively long reels, so that the nut cannot be threaded on the shaft far enough to properly hold a short spool.

When working in the field various types of mounts for reel devices may be encountered, but prior reel devices have generally been inadequate in providing versatility in utilizing various mounts, as will be obvious from a study of the previously mentioned patents, as well as U.S. Patents Nos.: 2,507,272, 2,527,634, 2,537,522, 2,765,991 and 2,963,239. By way of example it may be desirable and convenient to mount the reel device on a stub shaft such as the powered take-off spline of a tractor, or on a pulley, or in a suitable chuck. However, if provided, such mounting versatility must be practical in providing a sturdy construction and ease of handling, and this has not been satisfactorily accomplished in prior reel devices.

An important object of this invention is to provide a new and useful reel device of great versatility. A related object is provision of such a reel device for facilitating operative attachment thereof to various types of mounts. Another related object is provision of such a reel device utilizing various types of spools for handling wire or the like. A further related object is provision for incorporating relatively weak spools such as those on which lightweight wire is often sold. An important related object is the provision of new and useful components of such a reel device.

Another object is provision of a new and useful reel device particularly adapted for wniding or dispensing electric fence wire to facilitate erecting or dismantling electric fences.

A more specific object is provision of a wire handling device having a shaft with means at one end of the shaft for operatively attaching the device to various types of mounts, the shaft receiving a spool for wire between clutches operatively mounted on the shaft, with resilient washers, one between each end of the spool and adjacent clutch for effectively preventing sliding of the spool on the clutches, and means on the shaft and adjustable in overall length for urging the clutches and washers against spools of different lengths and varying the force with which the clutches are urged against the spool to control rotation of the spool on the shaft.

Other objects and advantages of the invention will become readily apparent in the following description taken in connection with the accompanying drawings, in which:

FIGURE 1 is a longitudinal view of a reel device embodying features of the invention, attached to a tractor power take-off stub shaft, and illustrating an embodiment of a mounting assembly;

FIGURE 2 is a longitudinal sectional view of the reel device as illustrated generally in FIGURE 1, but illustrating another embodiment of a mounting assembly;

FIGURE 3 is a fragmentary longitudinal view, with parts broken away to more clearly illustrate a common portion of both embodiments of the mounting assembly connected to a tractor belt pulley;

FIGURE 4 is a view similar to FIGURE 3, with the mounting assembly secured to a stationary support;

FIGURE 5 is a fragmentary longitudinal view of another portion common to both embodiments of the mounting assembly, showing the device attached to a chuck;

FIGURE 6 is a fragmentary longitudinal view of the reel device employed for winding wire;

FIGURE 7 is a left-hand elevational view of the device of FIGURES 1 or 2, removed from the power take-off stub shaft;

FIGURE 8 is an end elevational view of a part of the mounting assembly removed from the reel device shown in the embodiments of either FIGURES 1 or 2;

FIGURE 9 is an enlarged fragmentary sectional view taken generally along the line 9—9 of FIGURE 2;

FIGURE 10 is a fragmentary longitudinal view of a portion of the device, shown separately; and FIGURE 11 is a sectional view taken on the line 11—11 in FIGURE 1.

While illustrative embodiments of the invention are shown in the drawings and will be described in detail herein, the invention is susceptible of embodiment in many different forms, and it should be understood that the present disclosure is to be considered an exemplification of the principles of the invention and is not intended to limit the invention to the embodiments illustrated. The scope of the invention will be pointed out in the appended claims.

The invention is, in brief, directed to a wire handling reel device having a shaft with one end removably receiving a spool for wire or the like, having means at the other end for operatively attaching the device to various types of mounts, and as illustrated for attaching the device to a relatively stationary vertical or horizontal support, to a shaft or pulley, or to a chuck, or the like. Means is provided for controlling rotation of the spool with respect to the shaft and for utilizing different types of spools in the device. As illustrated, this means includes clutches mounted on the shaft on either side of the spool with resilient washers positioned between spool side flanges and adjacent clutches for effectively preventing slippage between the spool and clutches and resultant transmission of torque through the spool. Adjustable means is provided for conveniently holding the clutches and washers against the flanges of various length spools, and in the illustrated embodiments includes springs telescoped on the shaft and having spirals threaded together to adjust the overall length of the spring so that a retainer for the spring may be secured on an adjacent extremity of the shaft, irrespective of the spool length.

Referring to FIGURES 1 and 2 of the drawings, the preferred embodiment of a reel device or unit 12 includes a flange or disc 13 having a central opening 14 in which one end of a shaft 15 is received and secured, in any suitable manner as by a weld 16, to extend from an inner side of the disc 13. A short metal sleeve 17 is secured at one end, as by a weld 18, to the inner side of disc 13 so that sleeve 17 is disposed concentrically around a portion of the shaft 15. The opposite end of the sleeve 17 abuts against a clutch 17a and more particularly against an inner side of a disc 19 and is secured rigidly thereto as by weld 20. Disc 19 has a central opening 21 through which the shaft 15 extends. A washer 22, formed of clutch lining material, preferably impregnated with a dry lubricant, such as mica or graphite, for example, as is commercially available from Synthane Corp. under the tradename "Synthane," is loosely telescoped on shaft 15 against the outer side of the disc 19 and a metal ring or washer 23 is loosely mounted on the shaft against ring 22 and between ring 22 and a rubber washer 24 to be more fully described hereinafter. The washer 22 constitutes a clutch plate, and the disc 19 and metal ring 23 constitute pressure plates between which the clutch plate 22 is frictionally engaged, as will hereinafter become apparent.

The shaft 15, commencing at a point spaced outwardly from washer 24, has threads 25 extending to its opposite free end 26, and the threaded portion is provided with an axial keyway 27 which opens through the shaft end 26. A portion of shaft 15, between washer 24 and the inner end of threaded portion 25, telescopically receives a conventional spool 28, which may be of various types, for example such as that on which electric fence wire, or the like is commercially sold. Spool 28 will be more fully described hereinafter. After the spool 28 is telescoped on shaft 15 (over shaft end 26) a rubber washer 29 (similar to washer 24) is telescoped on the shaft, and a second clutch 19a including a metal washer 30, a washer 31 corresponding to the washer 22, and a metal washer 32 are applied to the shaft over its end 26 so that rubber washer 29 abuts an end of the spool 28 and is disposed between the spool end and metal washer 30. Metal washer 30 is disposed between the rubber washer 29 and a clutch holding portion in the form of a washer 31, which washer 31 is, in turn, disposed between the metal washers 30 and 32. Washers 29, 30, 31 and 32 are preferably of the same diameter as the washers 22, 23 and 24 and the disc 19. The washer 31 constitutes a clutch plate and the washers 30 and 32 constitute pressure plates, between which the clutch plate is disposed. The washers 29, 30 and 31 are loosely mounted on the shaft 15; however, the washer 32 has a key 33 engaging the keyway 27, so that washer or pressure plate 32 is slidably but non-turnably mounted on the shaft 15.

Two spiral compression springs 34 and 35 are closely telescoped on shaft 15 between the pressure plate 32 and the shaft end 26. Adjacent ends of these springs have their spirals threaded together to provide an adjustable length spring for accommodating different length spools, and controlling the pressure on the clutches. Retaining means in the form of a nut 36 is mounted adjustably on threads 25 at the extremity of shaft end 26, and beyond the outer end of the outer spring 35, with a small metal washer 37 loosely telescoped on shaft 15 between the nut 36 and spring 35. Nut 36 is adjusted for maintaining the springs 34 and 35 compressed so that the spool 28 is frictionally gripped between the rubber washers 24 and 29 to rotate therewith.

Since spools 28 may vary in overall length, the adjustable length springs are effective to compensate for variations in length and thus limit the distance that nut 36 must be threaded on and off of shaft 15 when changing spools.

As may best be seen in FIGURE 2, spool 28, of the type previously mentioned, is provided with a hollow core 37a telescoped on shaft 15, and has opposed generally circular end flanges 37b usually 5" to 6½" in diameter of suitable lightweight sheet metal usually reinforced as with ribs 37c stamped outwardly in the flanges and a peripheral rolled lip 37d, for strengthening the spool. It is also quite common to fixedly attach flanges 37b to core 37a as by a rolled lip connection 37e. Such spools are relatively weak and will not withstand appreciable torque so that slippage should be avoided between clutch pressure plates 23 and 30 and spool 28. To this end, suitable means is provided in the form of the previously mentioned resilient washers 24 and 29 of rubber or other material of a suitable type, sandwiched between the associated spool flanges and adjacent pressure plates. These rubber washers are about 3" in diameter and a ¼" thick, substantially softer than the clutch plates and resiliently conform in facial configuration to the protuberances, such as 37c and 37e on the adjacent spool flange 37b, and tightly grip these flanges. Preferably, rubber washers 24 and 29 have substantially the same resilient and deformable properties as the rubber of conventionl, current automobile tire side-walls. As may best be seen in FIGURE 11, in order to increase the ability of these washers to conform to the configuration of the spool flanges, concentric circular grooves, as 37f, may be provided in the faces of the rubber washers abutting the spool flanges. These grooves are preferably 1/16" wide and of about the same depth.

Reel device 12 also has mounting means for attaching the device to various mounts, and including an adapter 38 comprising a sleeve 39 and metal flange rings 40 and 41. Rings 40 and 41 have central openings 42 and 43, respectively, of the same diameter as the outer diameter of the sleeve 39 and in which the ends of the sleeve 39 are secured by welds 43' to adjacent inner sides of said rings. The outer diameter of the ring 41 is substantially less than the outer diameter of the ring 40 and is equal to the outer diameter of the disc 13. In the embodiment of FIGURE 1, a chuck adapter 44, to be more fully described hereinafter, has a circular flange 44a of the same size as and sandwiched between members 13 and 41. The disc 13, around the sleeve 17, flange 44a and the ring 41, around the sleeve 39, are provided with matching openings 45 for receiving fasteners 46 by which the adapters 38 and 44 are detachably secured to the disc 13 and thus to the shaft 15. Accordingly, disc 13 forms a coupler for the shaft 15. Each of the fastenings 46 comprises a bolt, nut and lock washer. The bolts of the fastenings 46 are preferably each ⅜" in diameter and the openings 45 are sized to detachably accommodate said bolts. The sleeve 39 has diametrically aligned openings 47 about midway of its ends to detachably receive a cotter pin 48.

Reel device 12 can be applied to a mounting stub such as a conventional splined power takeoff stub shaft 49 of a tractor 51 for winding wire on the spool 28. To apply the device 12, the cotter pin 48 is removed and sleeve 39 is telescoped onto spline shaft 49 and is adjusted to align the openings 47 with a conventional transverse bore 50 of the shaft 49, so that cotter pin 48 can be inserted through openings 47 and bore 50 for securing reel device 12 immovably to the power takeoff shaft. The power takeoff shaft 49 is then driven for winding the wire onto the spool 28, as illustrated in FIGURE 6, wherein electric fence wire 52 is shown being wound. If the wire 52 is detached from the fence posts, not shown, the tractor 51 may remain stationary and a drag, not shown, may be attached to the end of the wire 52 located remote from the spool 28, to maintain a proper tension on the wire as it is pulled toward the spool. A post or stake 53, as seen in FIGURE 6, such as an electric fence post, may be positioned to one side of the unit for guiding the wire 52 therearound and onto the spool 28. If the remote end of the wire 52 is anchored to a fence post, not shown, the tractor may be propelled toward said anchored end as the wire is wound on the spool 28, and the post or stake 53 may be mounted on a conventional part of the tractor, not shown, such as the drawbar, to assume its position as seen in FIGURE 6, so that it will move with the tractor 51 and reel device 12. Tractor 51 is propelled at a speed so that the wire 52 will be kept under proper tension during the winding of the wire. Should too great a tension be applied to the wire at any time, clutches 17a and 19a will permit spool 28, washers 24 and 29 and pressure plates 23 and 30 to turn relative to the shaft 15 as the clutch plates slip relative to their pressure plates to avoid the possibility of breaking the wire, with the spool effectively stationary with respect to rubber washers 24 and 29, thus avoiding twisting or otherwise damaging the spool.

The larger ring 40 of adapter 38, as seen in FIGURE 7, constitutes a coupler for the adapter 38 and is provided with a plurality of openings 54 which are disposed in spaced apart relation to one another and certain of which are spaced different distances from the center of said ring or coupler 40. As seen in FIGURE 3, the outer side of the ring 40 may be disposed against the outer side of a web 55 of a conventional belt pulley 56 of a tractor 57, so that certain of the openings 54 thereof will align with threaded openings 58 of the web 55. Screws 59 are applied through said openings 54 and threadedly secured in the openings 58, providing means for securing coupler 40 to belt pulley 56, so that the unit 12 can be utilized, as previously described and as fully illustrated in FIGURES 1, 2 and 6, for winding wire on the spool 28. When thus employed, as seen in FIGURE 3, the cotter pin 48 performs no function. The differently positioned openings 54 enable the coupler 40 to be attached, as illustrated in FIGURE 3, to belt pulley webs the openings of which are spaced different distances from the belt pulley axis.

When assembled as illustrated in FIGURES 1 and 2, reel device 12 may also be utilized for unwinding and stretching wire in erecting a fence. When thus employed, as seen in FIGURE 4, the coupler or ring 40 is positioned against an inner face of a side wall 60 of a truck or wagon body 61, and is secured thereto by a single fastener 62 which is passed through one of the openings 54 and through an opening 63 of the side wall 60. The fastening 62 preferably comprises a nut, bolt and washer. The unit 12 is thus supported crosswise of the body 61 which may contain the fence posts and other equipment for erecting the fence. If desired, reel device 12 may be similarly attached to a horizontal rather than a vertical mount. When thus utilized, reel device 12 does not revolve so that shaft 15 is stationary and the spool 28 rotates on the shaft 15 as slippage occurs between the clutch plates 22 and 31 and the pressure plates thereof, with the spool stationary with respect to rubber washers 24 and 29 and pressure plates 23 and 30. Nut 36 can be adjusted to maintain a proper tension on the fence wire 52 as the wire is thus unwound from the spool 28, and if desired the overall length of springs 34 and 35 may be adjusted. The fence posts can be driven into the ground and the wire 52 secured thereto as the vehicle 61 is propelled away from the anchored portion of the wire 52 so that erecting of the fence can be accomplished in a single operation with a proper tension on the wire as it is secured to each fence post.

Reel device 12 may also be utilized with various other power sources for winding wire on a conventional spool 28, either with or without the adapter 38. In FIGURE 5, reel device 12 is shown with adapter 38 removed and with torque applied to the reel device by a conventional electric drill 64.

With reference to the embodiment of FIGURE 1, chuck adapter 44 connects the flange or disc 13 to the electric drill 64 with flange 44a disposed against the outer side of the flange 13. Flange 44a has openings 67 aligning with the openings 45 of the coupler 13 and these members are secured together by the fasteners 46 received in aligned openings 45 and 67. Adapter 44 has a chuck adapter stub shaft 68 extending from the side of flange 44a which faces away from the coupler 13. Shaft 68 is axially aligned with the shaft 15 and is secured in a chuck 69 of the drill 64, so that when the drill is in operation to revolve the chuck 69, adapter 44 will rotate with the chuck so that wire can be wound on spool 28. Thus, stub 68 is protectively nested within sleeve 38 when the sleeve is secured to flange 13, and the sleeve may be readily removed for mounting the reel device in a chuck. As illustrated, chuck adapter 44 may be completely removed from the remainder of the reel device, and if desired this adapter may be secured to flange 13 as by fasteners independent of flange 41, so that sleeve 38 may be removed without disturbing the chuck adapter. Thus, chuck adapter 44 may be readily removed, and replaced should stub 68 become damaged.

With reference to FIGURE 2, chuck stub 68 is formed integrally with the end of shaft 15 thus eliminating flange 44a to simplify construction of the device and to avoid any possibility of loosening the stub 68. Aside from providing stub 68 integral with shaft 15, and eliminating chuck adapter 44, the remainder of reel device 12 as shown in FIGURE 2 is the same as that shown in FIGURE 1.

It should be emphasized that spools 28 come in different lengths and in order that the unit 12 can be utilized with spools 28 of different lengths, compression springs 34 and 35 are constructed so that they can be interwound with one another, as illustrated in FIGURES 1 and 2, to vary the effective length between the remote ends of the two springs to thus vary the space between the washers 24 and 29 to accommodate the spools of different lengths and to permit a desired tension to be applied to the spool for winding or unwinding the wire 52, as previously described.

To summarize the operation and function of reel device 12, means is provided for attaching the reel device to various types of supports. For example, in FIGURES 1 and 2 the reel device is mounted on a power takeoff stub shaft 49 of a tractor or other suitable mechanism by means of sleeve 39 telescoped over stub 49 and secured for rotation therewith by cotter key 48. In FIGURE 3, reel device 12 is attached to a pulley 56 by means of flange 40 secured to pulley web by suitable fasteners 59. In FIGURE 4 flange 40 is utilized in securing the reel device to a stationary support which may be either horizontal or vertical. In FIGURE 5 chuck adapter stub 68 is mounted in a chuck 69, the sleeve 39 having been previously removed, and this mounting is equally applicable to the modifications of either FIGURES 1 or 2. It should be noted that a very simple and practical means is provided for mounting reel device 12 on numerous types of supports thus vastly increasing its versatility in the field. Furthermore, the mounting means is such as to be easily handled and rugged and durable in use.

The preferred embodiment of the reel device as illustrated in the drawings and described herein is intended for use with various types of well-known lightweight spools, as previously described, but it should be understood that reel device 12 is in principle equally applicable to other types of spools, and particularly to more sturdy spools than those discussed herein. Various features of the invention are also applicable to other environments as will be obvious to one skilled in the art.

I claim:

1. In a reel device; a shaft having opposite ends; means at one of said shaft ends for operatively attaching said shaft to various types of mounts and including a chuck adapter stub, a sleeve having opposite open ends and a first of the last said ends normally telescoped about said chuck adapter stub and removably and fixedly connected with said one shaft end, means concentric with the shaft axis and including the end of said sleeve opposite the first sleeve end for telescopically and removably receiving a mounting stub and operatively attaching said shaft to said mounting stub, and means including a flange for releasably securing said shaft to another mount; a pair of clutches on said shaft, one of said clutches adjacent said one shaft end having a portion operatively fixed to said shaft and the other of said clutches being removably telescoped and axially movable on said shaft, each clutch having a pressure plate rotatable about said shaft and facially opposed to the pressure plate of the other clutch; a spool removably telescoped on said shaft and operatively received between said pressure plates, said spool having opposed end flanges with irregular outer faces, one at each of said pressure plates; resilient washers telescoped on said shaft, one between each spool flange and associated pressure plate, said washers having a high coefficient of friction relative to the adjacent pressure plate and spool flange when clamped therebetween to effectively hold said spool stationary with respect to said pressure plates; and means at the end of said shaft opposite said one shaft end releasably clamping together each associated clutch, washer, and spool end to hold said spool effectively stationary with respect to said pressure plates and adjust the holding power of said clutches and including, spiral compression springs on the opposite shaft end with spirals of said springs at least partially threaded together to facilitate varying the overall unstressed length of said springs and the holding power of said clutches, and retaining means releasably secured to and adjustable axially along said shaft at said opposite shaft end to compress said springs against said other clutch.

2. The reel device of claim 1 wherein said chuck adapter stub is integral with said shaft.

3. The reel device of claim 1 wherein said chuck adapter stub is detachably secured to said shaft.

4. In a reel device; a shaft having opposite ends; means at one of said shaft ends for operatively attaching said shaft to various types of mounts and including a chuck adapter stub axially aligned with and extending outwardly from said one shaft end, an elongated sleeve having opposite open ends and a first of the last said ends normally telescoped about said chuck adapter stub and removably and fixedly connected with said one shaft end whereby said chuck adapter stub is protectively nested in said sleeve and said sleeve may be removed to facilitate mounting said stub in a chuck or the like, means concentric with the shaft axis and including the end of said sleeve opposite the first sleeve end for telescopically and removably receiving a mounting stub and operatively attaching said shaft to said mounting stub, and a flange secured to and extending outwardly from the opposite sleeve end and generally concentric with said shaft axis, said flange having means for releasably securing said shaft to another mount; a pair of clutches on said shaft, one of said clutches adjacent said one shaft end having a portion operatively fixed to said shaft and the other of said clutches being removably telescoped and axially movable on said shaft, each clutch having a pressure plate rotatable about said shaft and facially opposed to the pressure plate of the other clutch; a spool for wire or the like removably telescoped on said shaft and operatively received between said pressure plates, said spool having opposed end flanges, one at each of said pressure plates; resilient washers telescoped on said shaft, one between each spool flange and associated pressure plate, said washers having grooves adjacent the associated spool outer face and being resiliently deformable into a configuration conforming generally to that of the associated spool face and having a high coefficient of friction relative to the adjacent pressure plate and spool face when clamped therebetween to effectively hold said spool stationary with respect to said pressure plates; and means at the end of said shaft opposite said one shaft end releasably clamping together each associated clutch, washer, and spool end to hold said spool effectively stationary with respect to said pressure plates and adjust the holding power of said clutches and including, spiral compression springs closely telescoped on the opposite shaft end with spirals of said springs at least partially threaded together to facilitate varying the overall unstressed length of said springs and the holding power of said clutches, and retaining means releasably secured to a limited portion of said shaft at the extremity of said opposite shaft end to compress said springs against said other clutch, the last said means including a nut threaded on said opposite shaft end.

5. In a reel device; a shaft; means for operatively attaching said shaft to various types of mounts and including a chuck adapter stub axially aligned with and extending outwardly from said shaft, a sleeve normally telescoped about said chuck adapter stub and removably and fixedly connected with said shaft for removably and fixedly attaching a mounting stub to said shaft, and a flange on said sleeve for releasably securing said shaft to another mount; a clutch on said shaft and having a holding portion; a spool on said shaft adjacent said clutch holding portion; means including a resilient member on said shaft between said spool and clutch holding portion effectively holding said spool against rotation relative to said clutch holding portion; and means on said shaft releasably clamping together said clutch, resilient member, and spool to hold said spool effectively stationary with respect to the holding portion of said clutch and for adjusting the holding power of said clutch, and including, spring means on said shaft and adjustable in unstressed overall length, and retaining means on said shaft to urge said spring means against said clutch.

6. In a reel device; a shaft; a clutch on said shaft and having a holding portion; a spool on said shaft adjacent said clutch holding portion; means including a resilient washer on said shaft between said spool and clutch holding portion effectively holding said spool against rotation relative to said clutch holding portion; and means on said shaft releasably clamping together said clutch holding portion, washer, and spool, and including spring means on said shaft and adjustable in unstressed overall length.

7. In a reel device; a shaft having opposite ends; a pair of clutches on said shaft, one of said clutches adjacent one shaft end having a portion operatively fixed to said shaft and the other of said clutches being removably telescoped and axially movable on said shaft, each clutch having a pressure plate rotatable about said shaft and facially opposed to the pressure plate of the other clutch; a spool for wire or the like removably telescoped on said shaft and operatively received between said pressure plates, said spool having opposed end flanges with irregular outer faces, one at each of said pressure plates; resilient washers telescoped on said shaft, one between each spool flange and associated pressure plate, said washers having grooves adjacent the associated spool outer face and being resiliently deformable into a configuration conforming generally to that of the associated spool face and having a high coefficient of friction relative to the adjacent pressure plate and spool face when clamped therebetween to effectively hold said spool stationary with respect to said pressure plates; and means at the end of said shaft opposite said one shaft end releasably clamping together each associated clutch, washer, and spool end to hold said spool effectively stationary with respect to said pressure plates and adjust the holding power of said clutches and including, spiral compression springs closely telescoped on the opposite shaft end with spirals of said springs at least partially threaded together to facilitate varying the overall length of said springs and the holding power of said clutches, and retaining means releasably secured to and adjustable axially along a limited portion of said shaft at the extremity of said opposite shaft end to compress said spring against said other clutch.

8. In a reel device; a shaft; a clutch removably telescoped and axially movable on said shaft, said clutch having a pressure plate rotatable about said shaft, a spool telescoped on said shaft and having an end at said pressure plate; and means releasably clamping together the clutch and spool end to hold said spool effectively stationary with respect to said pressure plate and adjust the holding power of said clutch and to including, spiral compression springs closely telescoped on said shaft with spirals of said springs at least partially threaded together to facilitate varying the overall unstressed length of said springs and the holding power of said clutch, and retaining means secured to said shaft to compress said springs against said clutch.

9. In a reel device; a shaft; a pair of clutches on said shaft, one of said clutches adjacent one shaft end having a portion operatively fixed to said shaft and the other of said clutches being removably telescoped and axialy movable on said shaft, each clutch having a pressure plate rotatable about said shaft and facially opposed to the pressure plate of the other clutch; a spool telescoped on said shaft and operatively received between said pressure plates, said spool having opposed end flanges, one at each of said pressure plates; and means at the end of said shaft opposite said one shaft end releasably clamping together each associated clutch and spool end to hold said spool effectively stationary with respect to said pressure plates and adjust the holding power of said clutches and including, spiral compression springs closely telescoped on the opposite shaft end with spirals of said springs at least partially threaded together to facilitate varying the overall length of said springs and the holding power of said clutches, and retaining means releasably secured to and adjustable axially along a limited portion of said shaft at the extremity of said opposite shaft end to compress said spring against said other clutch.

10. A wire winding and unwinding device comprising a coupler, means securing said coupler to a fixed or rotary driven part for supporting the device with said coupler stationary or rotary with the part, a shaft fixed to and projecting from said coupler in a direction away from said means, said shaft being supported by the coupler axially relative to said means, a spool for holding wound wire turnably mounted on said shaft between the coupler and an end of the shaft, disposed remote from the coupler, over which the spool is applied and removed, a first friction-type slip clutch carried by said shaft between said coupler and an adjacent end of the spool, a second friction-type slip clutch carried by the shaft between the other spool end and said shaft, compression spring means carried by and encircling said shaft between said shaft end and the second clutch and engaging yieldably against a part of the second clutch to permit the shaft to turn relative to the spool when a predetermined drag is applied to the spool or to permit the spool to turn on the shaft when a predetermined torque is applied to the spool, each of the clutches including a clutch plate and two pressure plates between which the clutch plate is disposed, one pressure plate of the first clutch located remote from the spool, being connected immovably to said coupler and disposed immovably on said shaft, one pressure plate of the second clutch constituting the part thereof engaged by said compression spring means, means slidably keying said pressure plate of the second clutch to the shaft, and an abutment detachably mounted on and rotatable with said shaft end and against which the spring means yieldably bears, said compression spring means comprising adjustably connected parts for varying the over-all length thereof and the force exerted thereby on said pressure plate of the second clutch.

11. A wire winding and unwinding device comprising a coupler, means securing said coupler to a fixed or rotary driven part for supporting the device with said coupler stationary or rotary with the part, a shaft fixed to and projecting from said coupler in a direction away from said means, said shaft being supported by the coupler axially relative to said means, a spool for holding wound wire turnably mounted on said shaft between the coupler and an end of the shaft, disposed remote from the coupler, over which the spool is applied and removed, a first friction-type slip clutch carried by said shaft between the coupler and an adjacent end of the spool, a second friction-type slip clutch carried by the shaft between the other spool end and said shaft end, two coiled compression springs slidably engaging on said shaft between said shaft end and the second clutch, one end of one of said springs bearing yieldably against a part of the second clutch, abutment means adjustably mounted on said shaft end, and one end of said other spring bearing against said abutment means to permit the shaft to turn relative to the spool when a predetermined drag is applied to the spool or to permit the spool to turn on the shaft when a predetermined torque is applied to the spool, said springs being of the same diameter and each having convolutions spaced slightly apart for partially interwinding the other adjacent ends of the two springs for varying the over-all length of the two springs between said abutment means and the second clutch to accommodate spools of different lengths between said clutches, and the diameter of the shaft being only slightly less than the internal diameters of the springs to retain the springs against lateral displacement out of their interwound relation to one another while disposed on the shaft.

12. In a reel device; a shaft for operatively mounting a spool and defining an axis of rotation for the spool, slip clutch means for transmitting torque between said shaft and said spool, said shaft having an end, first means for operatively mounting said shaft in a chuck to rotate about said axis and including a chuck adapter stub extending axially outwardly from said end of said shaft and adapted to be received in said chuck; second means for protecting said chuck adapter stub and for operatively mounting said shaft on another mount when said chuck adapter stub is not in use and including a sleeve freely telescoped about said chuck adapted stub and removably and securely connected with said shaft.

13. In a reel device; a shaft for operatively mounting a spool and defining an axis of rotation for the spool, slip clutch means for transmitting torque between said shaft and said spool, said shaft having an end, first means for operatively mounting said shaft in a chuck to rotate about said axis and including a chuck adapter stub of smaller diameter than said shaft and extending axially outwardly from said end of said shaft and adapted to be received in said chuck; second means for protecting said chuck adapter stub and for operatively mounting said shaft on another mount when said chuck adapter stub is not in use and including a torque transmitting sleeve freely telescoped about said chuck adapter stub and removably and securely connected with said shaft.

14. The reel device of claim 13 wherein said torque transmitting sleeve is radially spaced from said adapter stub and includes flanges secured to and extending radially outwardly from each sleeve end, each said flange having means for respectively securing said sleeve to said shaft and to another mount.

15. In a reel device; a shaft; a slip clutch on said shaft, said clutch having a holding portion; a spool on said shaft adjacent said clutch holding portion; and means including a resilient friction washer on said shaft between said spool and said clutch holding portion effectively holding said spool against rotation relative to said clutch holding portion as said clutch slips during winding and unwinding operation of the reel device, said washer having physical properties comparable to those of the side wall of a conventional automobile tire.

16. In a reel device; a wire holding spool; a shaft telescopically mounting said spool; a slip clutch on said shaft and having a holding portion adjacent said spool; and means including a resilient member effectively holding the spool against rotation relative to said clutch holding portion as said clutch slips during winding and unwinding operation of the reel device.

17. In a reel device; a shaft, a pair of slip clutches on said shaft, one of said clutches having a portion operatively fixed to said shaft and the other of said clutches being removably telescoped and axially movable on said shaft, each clutch having a pressure plate rotatable about said shaft and facially opposed to the pressure plate of the other clutch; a wire-holding spool removably telescoped on said shaft and operatively received between said pressure plates, said spool having opposed end flanges, one at each of said pressure plates, and resilient friction washers freely telescoped on said shaft, one between each spool flange and associated pressure plate, said washers having a high coefficient of friction relative to the adjacent pressure plate and spool flange when clamped therebetween to effectively hold said spool stationary with respect to said pressure plates as said clutches slip during winding and unwinding operation of the reel device, and means to clamp said spool flanges between said washers and pressure plates.

18. In a reel device; a shaft; a pair of slip clutches on said shaft, one of said clutches adjacent one shaft end having a portion operatively fixed to said shaft and the other of said clutches being removably telescoped and axially movable on said shaft, each clutch having a pressure plate rotatable about said shaft and facially opposed to the pressure plate of the other clutch; a spool for holding wire or the like removably telescoped on said shaft and operatively received between said pressure plates, said spool having opposed end flanges with irregular outer faces, one at each of said pressure plates; resilient washers freely telescoped on said shaft, one between each spool flange and associated pressure plate, said washers having grooves adjacent the associated spool outer face and being resiliently deformable into a configuration conforming generally to that of the associated spool face and said washers having a high coefficient of friction relative to the adjacent pressure plate and spool face when clamped therebetween to effectively hold said spool stationary with respect to said pressure plates as said clutches slip during winding and unwinding operation of the reel device; and means at an end of said shaft opposite said one shaft end releasably clamping together each associated clutch, washer, and spool end.

19. In a reel device; a shaft including a free end; a clutch assembly axially movable along said shaft and including an axially engageable clutch plate and pressure plate effective to permit slippage therebetween, and biasing means in operative engagement with said axially engageable clutch assembly and effective to establish and maintain a predetermined degree of said slippage, said biasing means including a spring and a retainer, said spring being positioned between said clutch and said free end and having one end operatively engaged with said clutch, said spring being adjustable in unstressed overall length to bring the other end of said spring in close proximity to said free end, regardless of the position of said clutch along said shaft, and said retainer means being adjustable along said shaft near said free end to apply pressure to said spring.

References Cited in the file of this patent

UNITED STATES PATENTS

| | | |
|---|---|---|
| 1,861,532 | Hough | June 7, 1932 |
| 2,616,637 | Schroeml | Nov. 4, 1952 |
| 2,692,092 | Kinsinger | Oct. 19, 1954 |
| 2,704,191 | Schley et al. | Mar. 15, 1955 |
| 2,765,991 | Frey et al. | Oct. 9, 1956 |
| 2,956,778 | Weide et al. | Oct. 18, 1960 |

FOREIGN PATENTS

| | | |
|---|---|---|
| 916,484 | France | Aug. 19, 1946 |